United States Patent
Du

(10) Patent No.: US 12,233,752 B2
(45) Date of Patent: Feb. 25, 2025

(54) SEAT-EMBEDDED SPEECH SENSORS

(71) Applicant: HARMAN INTERNATIONAL INDUSTRIES, INCORPORATED, Stamford, CT (US)

(72) Inventor: Yu Du, Chicago, IL (US)

(73) Assignee: Harman International Industries, Incorporated, Stamford, CT (US)

( * ) Notice: Subject to any disclaimer, the term of this patent is extended or adjusted under 35 U.S.C. 154(b) by 574 days.

(21) Appl. No.: 17/399,950

(22) Filed: Aug. 11, 2021

(65) Prior Publication Data

US 2023/0049919 A1     Feb. 16, 2023

(51) Int. Cl.

| | |
|---|---|
| *B60N 2/00* | (2006.01) |
| *A47C 7/62* | (2006.01) |
| *G01H 1/00* | (2006.01) |
| *G10L 21/0232* | (2013.01) |
| *G10L 25/21* | (2013.01) |
| *G10L 25/78* | (2013.01) |
| *H04R 1/08* | (2006.01) |
| *H04R 3/04* | (2006.01) |

(52) U.S. Cl.
CPC .............. *B60N 2/0033* (2023.08); *A47C 7/62* (2013.01); *G01H 1/00* (2013.01); *G10L 21/0232* (2013.01); *G10L 25/21* (2013.01); *G10L 25/78* (2013.01); *H04R 1/08* (2013.01); *H04R 3/04* (2013.01); *H04R 2410/07* (2013.01); *H04R 2499/13* (2013.01)

(58) Field of Classification Search
CPC .... B60N 2/002; B60N 2/0033; B60N 2/0021; B60N 2/0035; A47C 7/62; G10L 21/0232; G10L 25/21; G01H 1/00; H04R 1/08; H04R 3/04; H04R 2410/07
See application file for complete search history.

(56) References Cited

U.S. PATENT DOCUMENTS

| | | | | |
|---|---|---|---|---|
| 5,439,249 | A | * | 8/1995 | Steffens, Jr. ...... B60R 21/01526 280/739 |
| 8,672,853 | B2 | * | 3/2014 | Young .................. A61B 5/1102 600/300 |
| 10,491,998 | B1 | * | 11/2019 | Kominar ............... H04R 29/002 |
| 2006/0089753 | A1 | | 4/2006 | Eagen et al. |
| 2010/0305816 | A1 | * | 12/2010 | Orlewski .......... B60R 21/01526 701/45 |
| 2017/0347961 | A1 | | 12/2017 | Perraut et al. |

FOREIGN PATENT DOCUMENTS

| | | | | |
|---|---|---|---|---|
| DE | 102012021272 | * | 2/2014 | ......... B60R 21/0136 |
| EP | 3 618 465 A1 | | 3/2020 | |
| JP | 2007061490 A | * | 3/2007 | |

OTHER PUBLICATIONS

Wikipedia, "Throat microphone", Retrieved from https://en.wikipedia.org/wiki/Throat_microphone, on Dec. 14, 2021, 3 pages.

* cited by examiner

*Primary Examiner* — Milton Nelson, Jr.
(74) *Attorney, Agent, or Firm* — Artegis Law Group, LLP

(57) ABSTRACT

Embodiments of the present disclosure a computer-implemented method comprising receiving sensor data from one or more vibration sensors that are embedded within a seat, where the sensor data includes data associated with speech by an occupant of the seat, and at least one of processing, transmitting, or storing the sensor data based on the data associated with the speech.

20 Claims, 8 Drawing Sheets

To Audio Application 140

SEAT-EMBEDDED SPEECH SENSORS

BACKGROUND

Field of the Various Embodiments

The various embodiments relate generally to sensing systems and, more specifically, to seat-embedded speech sensors.

Description of the Related Art

Automotive microphones are useful for various applications, including hands-free communication. Conventionally, acoustic microphones are installed within the bodies of vehicles, such as in a headliner, sun visor, or overhead console. Oftentimes, the signal-to-noise ratio of sound data captured by such acoustic microphones can be poor due to (1) the relatively large distance between the source of sound (i.e., the mouth of a driver or passenger) and the location of the acoustic microphone, and (2) the noisy environment within the vehicle cabin. When the signal-to-noise ratio is poor, the intelligibility of the speech captured by an acoustic microphone may be degraded or even become unintelligible when played back on a speaker device or used in automated speech recognition, among other things.

The environmental noise within a vehicle is particularly harsh when there is a strong wind. For example, when a vehicle is being driven at a high speed, with windows open, with an open sun or moon roof, or with the top down in a convertible, wind noise can severely negatively affect the signal-to-noise ratio of sound data captured by an acoustic microphone. Further, wind noise can be difficult to remove or attenuate because wind noise cannot be easily differentiated from speech by a driver or passenger.

One approach for reducing the wind noise sensed by an acoustic microphone is to wrap the microphone with a bulky acoustic foam that dampens turbulent air flow around the microphone caused by wind. However, a microphone wrapped with acoustic foam cannot be easily installed in a headliner, sun visor, or elsewhere within a vehicle cabin.

Another approach for reducing the wind noise sensed by an acoustic microphone is to place the microphone at a location that is not exposed to wind turbulence but is still reasonably close to the source of sound (i.e., the mouth of a driver or passenger). However, no such location exists within the cabin of conventional vehicles.

As the foregoing illustrates, improved techniques for sensing speech in vehicles would be useful, particularly in cases when wind noise is present.

SUMMARY

One embodiment sets forth a computer-implemented method that includes receiving sensor data from one or more vibration sensors that are embedded within a seat. The sensor data includes data associated with speech by an occupant of the seat. The method further includes at least one of processing, transmitting, or storing the sensor data based on the data associated with the speech.

Another embodiment sets forth a seat. The seat includes a cushion, and a side of the cushion facing a user comprises a cavity. In addition, the seat includes a vibration sensor that is disposed within the cavity. The vibration sensor acquires vibration data that includes data associated with speech by an occupant of the seat. The vibration data is at least one of processed, transmitted, or stored based on the data associated with the speech.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques can be used to capture speech within a vehicle cabin with a better signal-to-noise ratio relative to speech that is captured using an acoustic microphone. As a result, the captured speech can be more intelligible than speech that is captured using an acoustic microphone, particularly when there is wind noise caused by the vehicle being driven at a high speed, with windows open, with an open sun or moon roof, or with the top down in a convertible. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
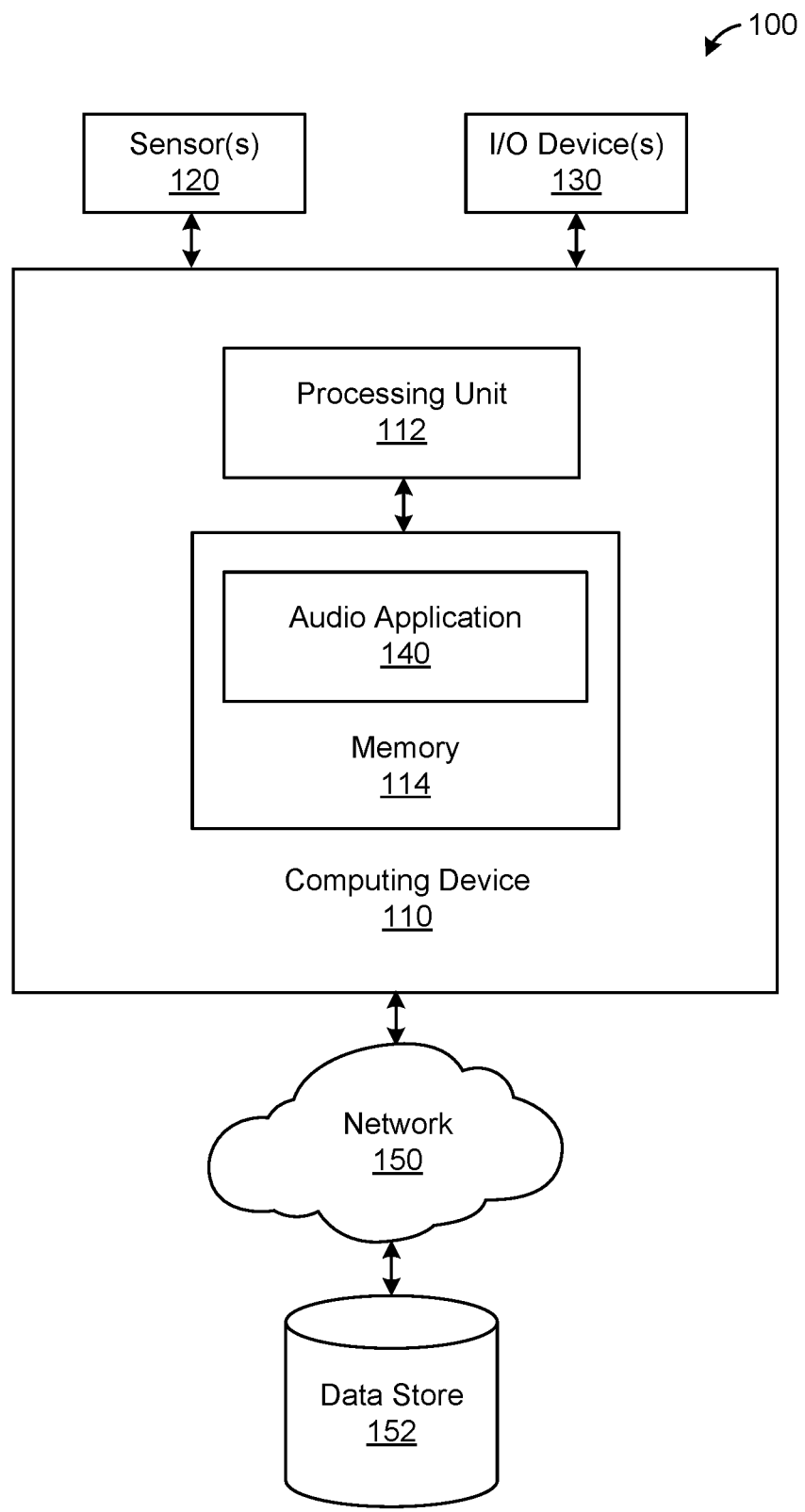
FIG. 1 illustrates a block diagram of a system configured to implement one or more aspects of the various embodiments.

FIG. 1 illustrates a block diagram of a system 100 configured to implement one or more aspects of the present disclosure. As shown, the system 100 includes, without limitation, computing device 110, sensor(s) 120, input/output (I/O) device(s) 130, a network 150, and a data store 152. The computing device 110 includes a processing unit 112 and a memory 114. The computing device 110 is a device that includes one or more processing units 112. In various embodiments, the computing device 110 can be a mobile computing device or a head unit included in a vehicle system. Various examples of the computing device 110 include mobile devices (e.g., cellphones, tablets, laptops, etc.), wearable devices (e.g., watches, rings, bracelets, headphones, etc.), consumer products (e.g., gaming, etc.), smart home devices (e.g., smart lighting systems, security systems, digital assistants, etc.), communications systems (e.g., conference call systems, video conferencing systems, etc.), and so forth. More generally, the computing device 110 can be any technically-feasible computing device, such as a laptop, a desktop, or a server, in some embodiments. The embodiments disclosed herein contemplate any technically-feasible system configured to implement the functionality of the system 100 via the computing device 110. Computing device 110 can be located in various environments including, without limitation, road vehicle environments (e.g., consumer car, commercial truck, etc.), aerospace and/or aeronautical environments (e.g., airplanes, helicopters, spaceships, etc.), nautical and submarine environments, indoors environments (e.g., offices, homes, warehouses, data centers, etc.), and so forth.

Processing unit 112 can include one or more central processing units (CPUs), digital signal processing units (DSPs), microprocessors, application-specific integrated circuits (ASICs), neural processing units (NPUs), graphics processing units (GPUs), field-programmable gate arrays (FPGAs), a combination thereof, and so forth. The processing unit 112 generally comprises one or more programmable processors that execute program instructions to manipulate input data. In some embodiments, the processing unit 112 can include any number of processing cores, memories, and other modules for facilitating program execution.

The memory 114 can include a memory module or collection of memory modules. The memory 114 generally includes storage chip(s) such as random access memory (RAM) chips that store application programs and data for processing by the processing unit 112. In various embodiments, memory 114 can include non-volatile memory, such as optical drives, magnetic drives, flash drives, or other storage. In some embodiments, separate data stores, such as data store 152 accessible via the network 150 ("cloud storage") can supplement memory 114.

As shown, the memory 114 stores an audio application 140. In operation, the processing unit 112 executes the audio application 140. As discussed in greater detail below, the audio application 140 receives and processes sensor data captured by one or more seat-embedded vibration sensors that acquire vibration data and are included in the sensor(s) 120. The sensor(s) 120 can also include one or more acoustic sensors, such as a microphone and/or a microphone array, that acquires sound data, and the sound data can also be processed by the audio application 140. In some embodiments, the sensor(s) 120 can be coupled to and/or included within the computing device 110.

The I/O device(s) 130 can include devices capable of receiving input, such as a keyboard, a mouse, a touch-sensitive screen, a microphone and other input devices for providing input data to computing device 110. In various embodiments, the I/O device(s) 130 can include devices capable of providing output, such as a display screen, loudspeakers, and the like. One or more of I/O devices 130 can be incorporated in the computing device 110 or may be external to the computing device 110.

The network 150 enables communications between the computing device 110 and other devices via wired and/or wireless communications protocols, such as Bluetooth, Bluetooth low energy (BLE), wireless local area network (WiFi), cellular networks, satellite networks, vehicle-to-vehicle (V2V) networks, and/or near-field communications (NFC).

Seat-Embedded Vibration Sensors

Figure 2:
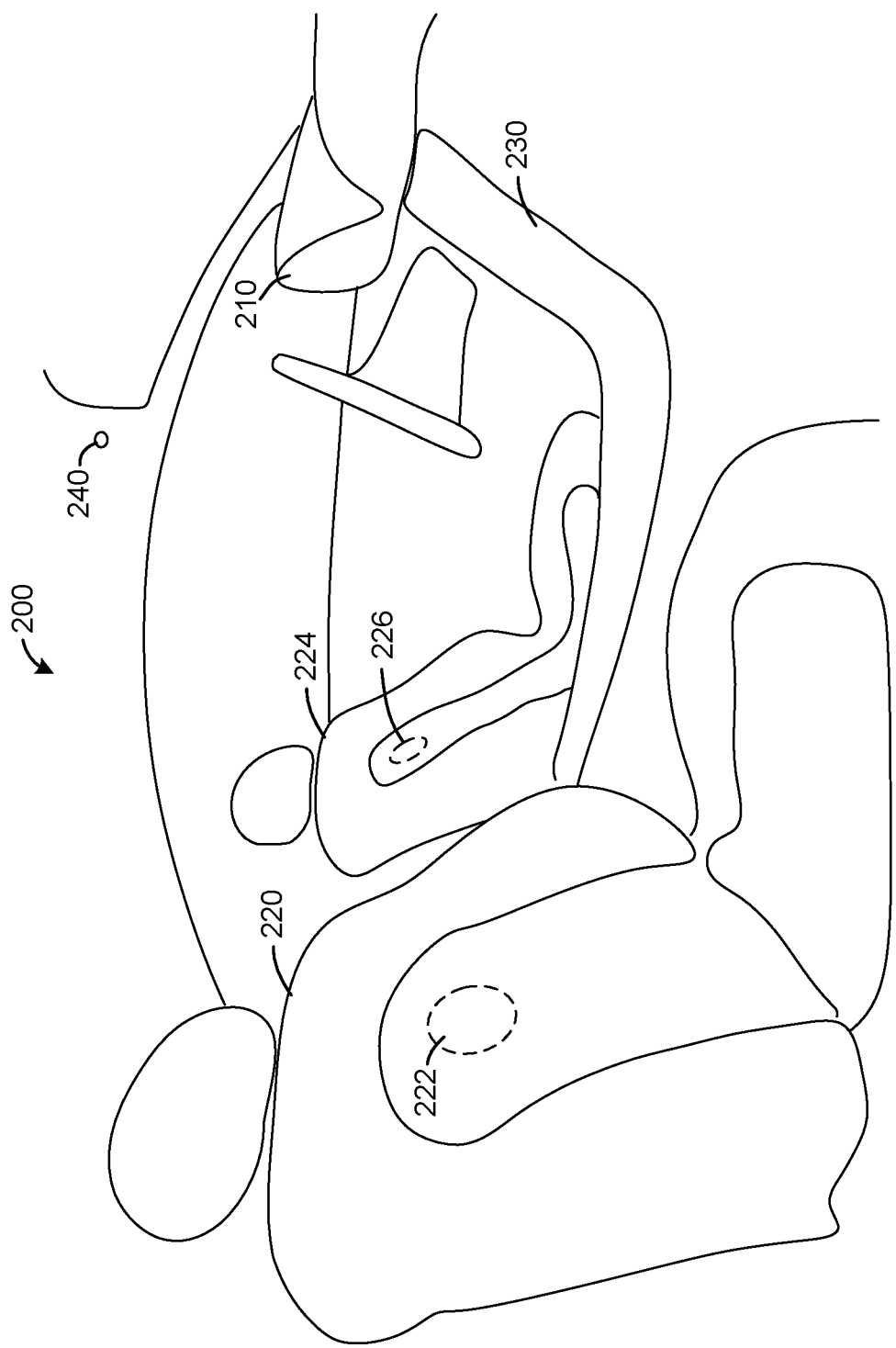
FIG. 2 illustrates a view from a passenger compartment of a vehicle, according to various embodiments.

FIG. 2 illustrates a view from a passenger compartment 200 of a vehicle, according to various embodiments. In some embodiments, the passenger compartment 200 can correspond to the environment associated with the system 100, described above in conjunction with FIG. 1. As shown, the passenger compartment 200 includes, without limitation, a dashboard 210, seats 220 and 224, and a head unit 230. In various embodiments, the passenger compartment 200 can include any number of additional components, such as a rear-view camera (not shown), that implement any technically-feasible functionality.

As shown, the head unit 230 is located at a center of the dashboard 210. In various embodiments, the head unit 230 can be mounted at any location within the passenger compartment 200, and in any technically-feasible fashion, that does not block a windshield. The head unit 230 can include any number and type of instrumentation and applications and provide any number of input and output mechanisms. Further, the head unit 230 can support any number of input and output data types and formats, as known in the art. For example, in some embodiments, the head unit 230 can include built-in Bluetooth for hands-free calling and/or audio streaming, speech recognition, universal serial bus (USB) connections, rear-view camera inputs, video outputs for any number and type of displays, and any number of audio outputs. In addition, external devices may communicate with the head unit 230 in any technically-feasible fashion.

In various embodiments, any number of sensors, displays, receivers, transmitters, etc., may be integrated into the head unit 230, or may be implemented externally to the head unit 230 within the passenger compartment 200. As shown, vibration sensors 222 and 226 are embedded within each of the seats 220 and 224, respectively. In some embodiments, each of the vibration sensors 222 and 226 includes a transducer element that detects vibrations and converts the same into electrical signals. The vibrations can be detected as any related physical quantity, such as vibrational displacement/deformation, dynamic strain/stress, velocity, and/or acceleration. Although discussed herein primarily with respect to vehicle seats (e.g., the seats 220 and 224) as a reference example, in some embodiments, vibration sensors can be embedded within seats that are not included in vehicles. For example, vibration sensor(s) could be embedded within a seat that is used in a home or office environment.

In operation, each vibration sensor 222 or 226 can acquire vibration data associated with the speech of a driver or passenger who is seated on the seats 220 or 224, respectively, and is in contact with the vibration sensor 222 or 226. Speech requires vocal duct movements that, in addition to transmitting sound through the air, cause vibrations to be transmitted through solid structures within the body, including bones (e.g., the backbone and ribs). The energy of the bone vibrations is correlated with the speech generated by the vocal duct movements. Vibration sensors (e.g., vibration sensors 222 and 226) that detect such vibration energy are also sometimes referred to as "bone-conduction sensors" or "contact microphones." As described, the vibrations can be detected as, e.g., displacements/deformations, dynamic strain/stress, velocities, and/or accelerations, and any technically-feasible types of vibration sensors can be used to detect the desired physical quantities. In order to detect vibrations associated with speech, each vibration sensor in some embodiments has a signal bandwidth of at least 3 kHz, which permits the vibration sensor to detect any vibrations having frequencies below 3 kHz. In particular, in some embodiments, each vibration sensor can have a bandwidth of 4 kHz-6 kHz and be able to pick up signals below the bandwidth value.

In some embodiments, each of the seats 220 and 224 includes, among other things, (1) a foam cushion layer, and (2) a seat cover that is placed above the foam cushion layer to protect the seat 220 or 224 from dust, spills, etc. As discussed in greater detail below in conjunction with FIG. 4, the foam cushion layer of each seat 220 or 224 can include a cavity that is cut out of the foam cushion layer. The vibration sensor 222 or 226 can be secured inside the cavity using adhesive, or by any other mechanical means. Once secured inside the cavity, the vibration sensor 222 or 226 is supported/pushed outwards by the foam cushion layer towards the seat cover. Because each vibration sensor 222 or 226 is embedded in the foam cushion layer of the seats 220 or 224, respectively, the body of a driver or passenger who is seated on the seat 220 or 224 can block wind noise from reaching the vibration sensor 222 or 226, thereby improving the signal-to-noise ratio of vibration signals corresponding to speech that are generated by the vibration sensor 222 or 226.

As shown, each vibration sensor 222 or 226 is embedded at a location within a seatback of the seat 220 or 224, respectively, so that vibration sensor 222 or 226 can make contact with the clothed or unclothed upper back of a driver or passenger who is seated on the seat 220 or 224 and rests his or her back on the seatback. The embedding locations of vibration sensors within seats can depend on the ergonomic designs of the seats in some embodiments. Experience has shown that more vibrations associated with speech can be sensed by vibration sensor(s) embedded within a seat that are in contact with the clothed or unclothed upper back of a driver or passenger than by vibration sensor(s) embedded within a seat that are in contact with other clothed or unclothed regions of the body. However, in some embodiments, vibration sensor(s) can be embedded within a seat at locations other than within the seatback.

Each vibration sensor 222 or 226 should be large enough to reliably contact the bodies of different drivers or passengers, who may have various body sizes and proportions, that are seated on the seat 220 or 224, respectively. However, if the vibration sensor 222 or 226 is too large, then the vibration sensor 222 or 226 may negatively affect the aesthetic appearance and/or comfort of the seat 220 or 224. In some embodiments, each vibration sensor 222 or 226 can be 5 mm-50 mm in diameter. Although shown as being circular for illustrative purposes, vibration sensors can be any technically-feasible shape and size in other embodiments. For example, in some embodiments, each vibration sensor can have an elongated shape (e.g., an oval or rectangular shape) in which a height of the vibration sensor is greater than a width of the vibration sensor. The elongated shape permits the vibration sensor to make contact with the clothed or unclothed portions of the bodies of drivers or passengers having different heights when those drivers or passengers are seated on a seat in which the vibration sensor is embedded.

Vibration data acquired by the vibration sensors 222 and 226 can be transmitted to the audio application 140, and/or elsewhere, for processing. For example, the audio application 140 could be a Bluetooth application that permits hands-free communication in which vibration data is transmitted to another device or vehicle for playback as sounds via one or more speakers. As another example, the audio application 140 could be a voice recording application that stores the detected vibration data within a file in a data store (e.g., the data store 152). As a further example, the audio application 140 could be a virtual assistant or other application that recognizes speech from the vibration data and performs actions based on the recognized speech. As a general matter, the audio application 140 can process vibration data in any technically-feasible manner.

In some embodiments, the audio application 140 processes the vibration data acquired by vibration sensors 222 and 226 using frequency filtering. In some embodiments, the frequency filtering includes applying a high-pass filter to remove low-frequency energies that may be associated with vehicle vibrations, such as vibrations caused by the vehicle driving on a road. For example, the high-pass filter could remove data associated with vibration energies that are less than 200 Hz-300 Hz in frequency. In some embodiments, the frequency filtering filter further includes applying a low pass filter with a cut off frequency between 1 kHz and 4 kHz, because almost little to no bone-conducted speech energy is included in vibration data above the 1 kHz to 4 kHz frequency range.

In some embodiments, the audio application 140 can apply a machine learning or voice reconstruction technique to the vibration data. Generally, speech energies detected by vibration sensors that are in contact with clothed or unclothed portions of a body (e.g., vibration sensors 222 and 226) may be narrower in bandwidth and include mostly lower frequency contents than the energies associated with speech that is transmitted through the air. For example, an acoustic microphone could sense the full band of an air-transmitted speech signal, including both low frequencies (e.g., <2 kHz) and high frequencies (e.g., >2 kHz). Due to the limitations of the bone-transmitted path that acts naturally as a low-pass filter, the seat-embedded vibration sensors 222 and 226 may only acquire the lower end of the speech energy (e.g., <2 kHz), because high frequency speech energy diminishes quickly with increasing frequency above 2 kHz when passing through bone structures. In some embodiments, a machine learning or voice reconstruction technique can be applied to reconstruct more naturally-sounding speech from vibration data acquired by the vibration sensors 222 and 226.

In some embodiments, the audio application 140 can combine vibration data acquired by the vibration sensors 222 and 226 with sound data acquired by an acoustic microphone 240. As shown, the acoustic microphone 240 is installed within a headliner of the passenger compartment 200. In other embodiments, one or more acoustic microphones may be installed at any technically-feasible location or locations within a vehicle. The audio application 140 can combine the vibration data acquired by the vibration sensors 222 and 226 with the sound data acquired by the acoustic microphone 240 in any technically-feasible manner. For example, in some embodiments, the audio application 140 can digitally add frequency contents included in the vibration data to frequency contents included in the sound data when the sound data includes less than a threshold amount of low-frequency energy. Including less than the threshold amount of low-frequency energy may indicate that the sound data contains relatively little wind noise. If the sound data includes more than the threshold amount of low-frequency energy, then only vibration data that is acquired by the vibration sensors 222 and 226 is used, because speech may be unintelligible from the sound data. As another example, the audio application 140 can add frequency contents indicated by the vibration data to frequency contents indicated by the sound data when the vibration data signal includes more than a threshold amount of high-frequency energy, indicating that speech is being detected by the vibration sensors 222 and 226. More generally, in some embodiments, the audio application 140 can determine whether to combine the vibration data acquired by the vibration sensors 222 and 226 with the sound data acquired by the acoustic microphone 240 based on a level of the signals detected by the vibration sensors 222 and 226 and the acoustic microphone 240 and the frequency contents of those signals.

In some embodiments, the audio application 140 only uses vibration data acquired by the vibration sensor 222 or 226 when the audio application 140 determines that a driver or passenger is in contact with the vibration sensor 222 or 226. For example, in some embodiments, a pressure sensor or contact switch can be embedded within the seats 220 and 224 proximate to each of the vibration sensors 222 and 226. In such cases, the audio application 140 can only use vibration data acquired by the vibration sensor 222 or 226 (alone, or in combination with sound data acquired by the acoustic microphone 240) when the audio application 140 receives a signal from a corresponding pressure sensor or contact switch due to a portion of the clothed or unclothed body of a driver or passenger leaning against the pressure sensor or contact switch, indicating that the clothed or unclothed portion of the body of the driver or passenger is also in contact with the vibration sensor 222 or 226 that is proximate to the pressure sensor or contact switch. When the audio application 140 does not receive a signal from the pressure sensor or contact switch, the audio application 140 can use sound data acquired by the acoustic microphone 240.

Figure 3:
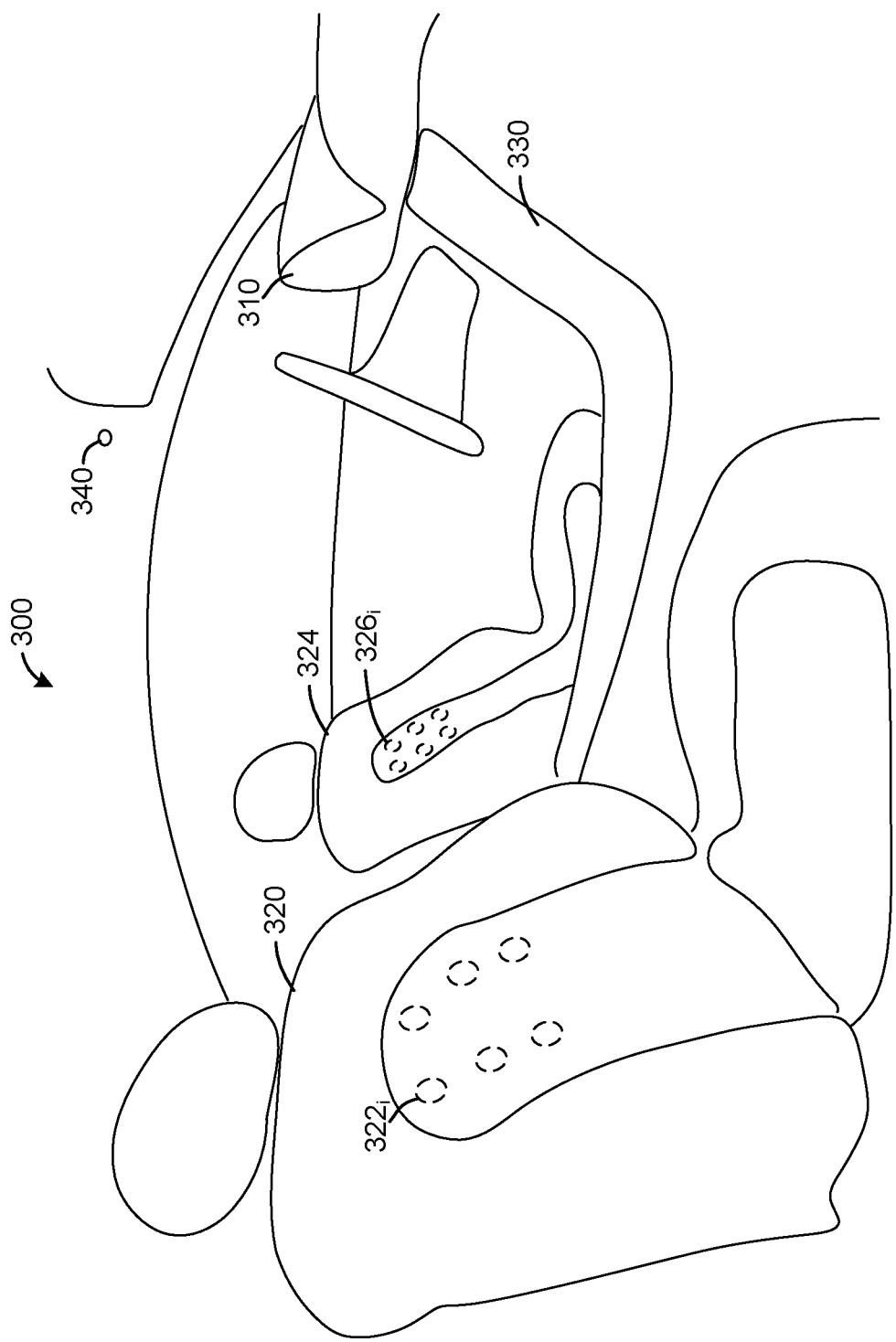
FIG. 3 illustrates a view from a passenger compartment of a vehicle, according to various other embodiments.

FIG. 3 illustrates a view from a passenger compartment 300 of a vehicle, according to various other embodiments. As shown, the passenger compartment 300 includes, without limitation, a dashboard 310, seats 320 and 324, a head unit 330, and an acoustic microphone 340, which are similar to the dashboard 210, the seats 220 and 224, the head unit 230, and the acoustic microphone 240, respectively, described above in conjunction with FIG. 2. In various embodiments, the passenger compartment 200 can include any number of additional components that implement any technically-feasible functionality.

As shown, multiple vibration sensors 322, (individually referred to a vibration sensor 322 and collectively referred to as vibration sensors 322) are embedded within the seat 320, and multiple vibration sensors 326, (individually referred to a vibration sensor 326 and collectively referred to as vibration sensors 326) are embedded within the seat 324. As described, the bodies of drivers and passengers can have different sizes and proportions. The multiple vibration sensors 322 or 326 embedded within each seat 320 or 324 are spaced apart so as to increase the probability that at least one of the vibration sensors 322 or 326 is in contact with a clothed or unclothed portion of the body of a driver or passenger who is seated on the seat 320 or 324. Each vibration sensor 322 or 326 can acquire vibration data associated with any technically-feasible physical quantity, such as vibrational displacement/deformation, dynamic strain/stress, velocity, and/or acceleration. In alternative embodiments, one or more vibration sensors can be embedded at locations within a seat other than the locations shown in FIGS. 2-3.

In some embodiments, each vibration sensor 322 or 326 can be relatively small compared to vibration sensor 222 or 226 described above in conjunction with FIG. 2. For example, each vibration sensor 322 or 326 could be microelectromechanical system (MEMS) device, such as a MEMS accelerator.

Vibration data acquired by the vibration sensors 322 or 326 can be processed in any technically-feasible manner, including by combining the vibration data from multiple vibration sensors 322 or 326, by applying frequency filtering, by applying a machine learning or voice reconstruction technique to the vibration data, and/or by combining the vibration data from one or more vibration sensors 322 or 326 with sound data acquired by the acoustic microphone 340, similar to the discussion above in conjunction with FIG. 2.

Figure 4:
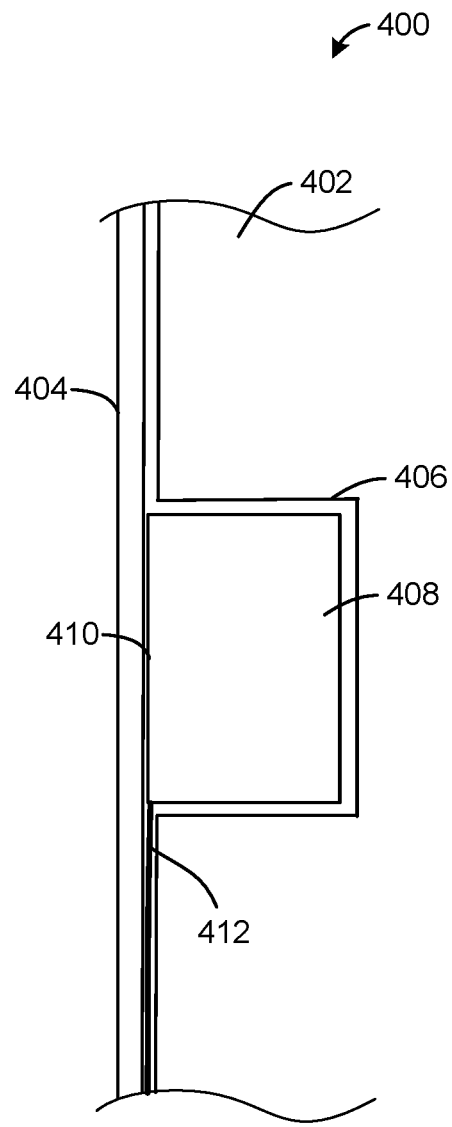
FIG. 4 illustrates a vibration sensor embedded within a seatback, according to various embodiments.

FIG. 4 illustrates a vibration sensor embedded within a seatback, according to various embodiments. As shown, a foam cushion layer 402 within a seat 400 (corresponding to one of the seats 220, 224, 320, or 324) includes a cavity 406 that is cut out of the foam cushion layer 402. A vibration sensor 408 (corresponding to one of the vibration sensors 222, 226, 322, or 326) is placed within the cavity 406 and supported/pushed outwards by the foam cushion layer 402 towards a seat cover 404. The foam cushion layer 402 and the seat cover 404 can be constructed from any technically-feasible materials. For example, the seat cover could be a leather or cloth seat cover that is 1-5 mm thick.

In operation, when the back of a driver or passenger, who is seated on the seat 400, is in contact with an outward-facing surface 410 of the vibration sensor 408, the vibration sensor 408 can acquire vibration data associated with speech of the driver or passenger. To achieve a reliable contact with the clothed or unclothed portion of a body of the driver or passenger, the outward-facing surface 410 of the vibration sensor 408 can slightly protrude beyond a surface of the seatback foam cushion layer 402 of the seat 400 in some embodiments. The vibration data that is acquired by the vibration sensor 408 can be transmitted via a wire 412 to the audio application 140 for processing. In other embodiments, the vibration data may be transmitted wirelessly.

Figure 5A:
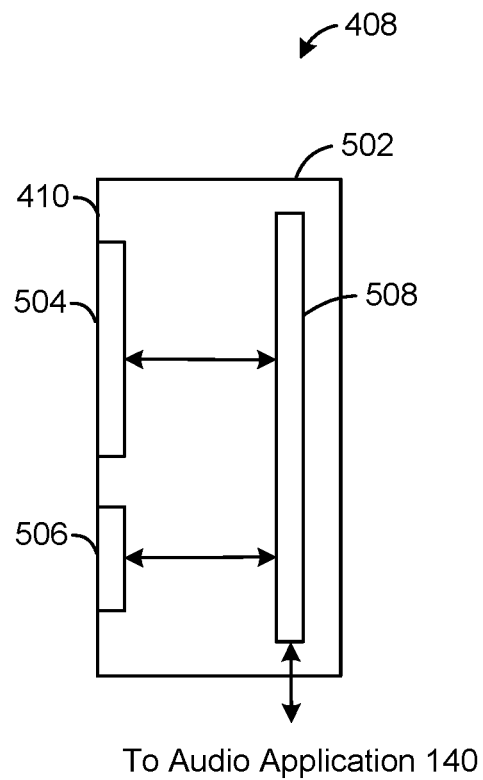
FIGS. 5A-5B illustrate in greater detail the vibration sensor of FIG. 4, according to various embodiments.
Figure 5B:
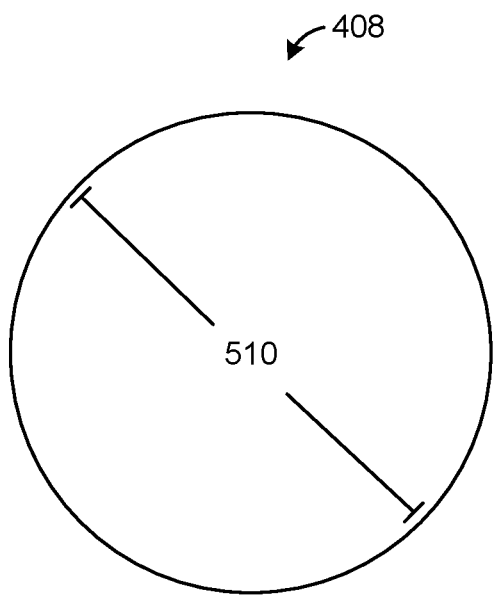

FIGS. 5A-5B illustrate in greater detail the vibration sensor 408 of FIG. 4, according to various embodiments. As shown in FIG. 5A, the vibration sensor 408 includes a housing 502, a transducer element 504, a contact switch 506, and a printed circuit board assembly (PCBA) 508. The housing 502 is a protective structure that encloses the transducer element 504, the contact switch 506, and the PCBA 508. Although shown as being rectangular, the housing 502 can have any suitable shape in other embodiments.

As shown, the transducer element 504 is mounted on the outward-facing surface 410 of the vibration sensor 408. In other embodiments, a transducer element can be rigidly connected to the outward-facing facing surface of a vibration sensor. In operation, the transducer element 504 detects mechanical vibrations and converts the vibrations into electrical signals. As described, vibrations can be detected by the transducer element 504 as any type of physical quantity, such as vibration displacement/deformation, dynamic strain/stress, velocity, and/or acceleration. In some embodiments, the transducer element 504 can be a piezoelectric element that measures dynamic strain/stress and/or acceleration. For example, the piezoelectric element could be constructed from a flexible polyvinylidene fluoride (PVDF) film or a lead zirconate titanate (PZT) material that is coated on a stiff copper disk. In such a case, when the piezoelectric element is vibrated by the body or otherwise moves due to speech, then the piezoelectric element will also vibrate, and the vibration of the piezoelectric element will generate a voltage output due to the piezoelectric effect. In other embodiments, the transducer element 504 can be any other technically-feasible type of element that senses dynamic strain/stress, acceleration, velocity, and/or displacement. For example, in some embodiments, the transducer element 504 can be a transducer in an integrated accelerometer element, a pressure sensor, a strain gauge, or a MEMS device, among other things.

In some embodiments, the PCBA 508 includes circuitry that powers the transducer element 504 and receives electrical signals from the transducer element 504 and the contact switch 506. In some embodiments, the PCBA 508 can also include one or more signal processing components. For example, the PCBA 508 could include an amplifier that amplifies electrical signals from the transducer element 504 before the amplified signals are transmitted through the housing 502 to the audio application 140.

The PCBA 508 is further connected to the contact switch 506. Any technically-feasible contact switch can be used in some embodiments. For example, the contact switch 506 could include contacts that touch to complete a circuit when the clothed or unclothed portion of the body of a driver or passenger presses against the contact switch 506, and separate when no driver or passenger is in contact with the contact switch 506. The contact switch 506 can be replaced with a pressure sensor in some embodiments. In some embodiments, the circuitry included in the PCBA 508 receives signals from the contact switch 506 (or a pressure sensor) and transmits the same through the housing 502 to the audio application 140. As described above in conjunction with FIG. 2, signals from the contact switch 506 (or a pressure sensor) can be used to determine whether signals generated by the transducer element 504 that is proximate to the contact switch 524 are due to speech vibrations.

Although shown as being within the housing 502, in some embodiments, the PCBA 508 can be located elsewhere, or functionalities of the PCBA 508 can be performed by other components such as the computing device 110 described above in conjunction with FIG. 1.

As shown in FIG. 5B, an outward-facing surface of the vibration sensor 408 can be circular in shape. As described, the vibration sensor 408 can have a diameter 510 of 5 mm-50 mm in some embodiments to increase the chance that the clothed or unclothed portion of the body of a driver or passenger who is seated on a seat that includes the vibration sensor 408 makes reliable contact with the vibration sensor 408. More generally, vibration sensors can be any technically-feasible shape and size in some embodiments.

Figure 6A:
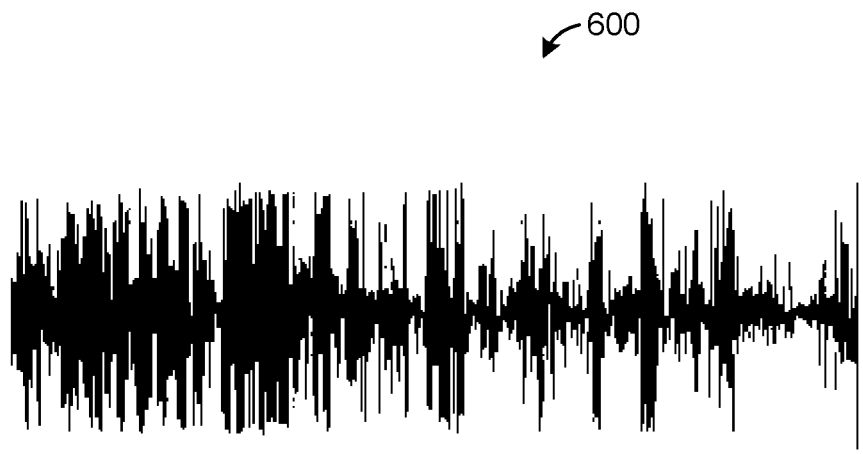
FIGS. 6A-6B illustrate example waveforms associated with sound data acquired by an acoustic microphone and vibration data acquired by a vibration sensor, according to various embodiments.
Figure 6B:
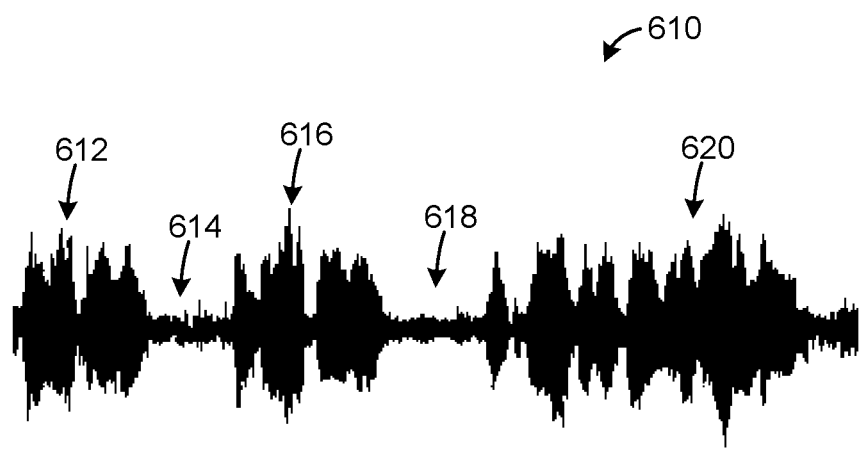

FIGS. 6A-6B illustrate example waveforms associated with sound data acquired by an acoustic microphone and vibration data acquired by a vibration sensor, respectively, according to various embodiments. As shown in FIG. 6A, a waveform 600 is associated with sound data acquired by an acoustic microphone mounted on an overhead console within the cabin of a sedan car driving at 50-60 miles per hour with both front windows open. In the sound data, speech is mixed together with wind noise that cannot be easily distinguished from the speech. Due to the poor signal-to-noise ratio, the speech can be unintelligible when being, e.g., played back on a speaker device or used in automated speech recognition.

As shown in FIG. 6B, a waveform 610 is associated with vibration data acquired by a single-axis accelerometer embedded within a seat of the same sedan being driven at 50-60 miles per hour with both front windows open. As shown, the waveform 610 includes distinct regions 612, 616, and 620 that are associated with speech and other regions 614 and 618 that are associated with only wind noise. Because the vibration data has a better signal-to-noise ratio than the sound data, described above in conjunction with FIG. 6A, speech can be more intelligible when the vibration data is played back on a speaker device or used in automated speech recognition, among other things. However, the vibration data typically includes fewer frequency components of the speech than the sound data, because speech correlated energies transmitted through body/bone vibrations are generally limited to frequencies of up to 2 kHz-3 kHz, whereas sound traveling through the air can have higher frequencies. As a result, the voice of a driver or passenger can sound muffled or unnatural when the vibration data is played back via a speaker relative to when the sound data is played back, i.e., the sound data provides higher voice fidelity than the vibration data. In some embodiments, vibration data can be combined with sound data acquired by an acoustic microphone when the sound data includes less than a threshold amount of low-frequency energy to provide both speech intelligibility and voice fidelity, as described above in conjunction with FIGS. 2-3. In some embodiments, machine learning or voice reconstruction techniques can be used to reconstruct a more natural-sounding voice from the vibration data, as described above in conjunction with FIGS. 2-3. In particular, the machine learning or voice reconstruction technique can be used to reconstruct components of speech at higher frequencies that are not included in the vibration data. For example, an artificial neural network could be trained based on examples of the voice of a driver or passenger and thereafter applied to reconstruct the same voice from vibration data.

Figure 7:
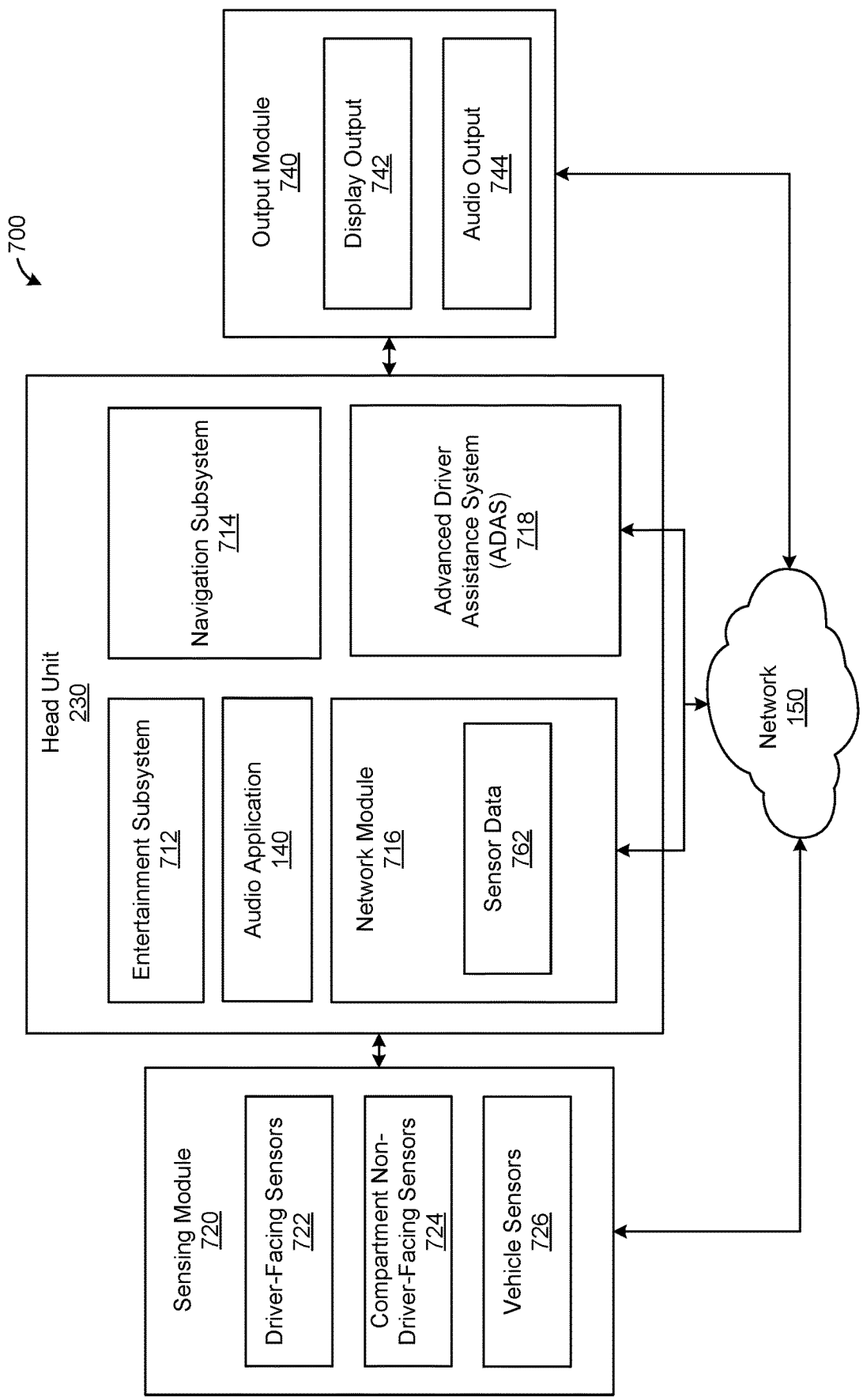
FIG. 7 illustrates an example vehicle system that includes the audio application of FIG. 1, according to various embodiments.

FIG. 7 illustrates an example vehicle system that includes the audio application 140 of FIG. 1, according to various embodiments. As shown, the vehicle system 700 includes sensing module 720, head unit 230, network 150, and an output module 740. The sensing module 720 includes driver-facing sensors 722, compartment non-driver facing sensors 724, and vehicle sensors 726. In some embodiments, the driver-facing sensors 722 and compartment non-driver facing sensors 724 include one or more seat-embedded vibration sensors, such as the vibration sensors 222, 226, 322, 326, or 408, and one or more acoustic microphones, such as the acoustic microphones 240 or 340, described above in conjunction with FIGS. 2-5. Other sensors in the sensing module 720 can include cameras, motion sensors, pressure sensors, temperature sensors, outward-facing cameras, etc. In various embodiments, vehicle sensors 726 may further include other external sensors, such as optical sensors, acoustic sensors, road vibration sensors, temperature sensors, etc. In some embodiments, sensing module and/or network module 716 may acquire other external data, such as geolocation data (e.g., GNNS systems, including a global positioning system (GPS), Glonass, Galileo, etc.).

The head unit 230 includes an entertainment subsystem 712, a navigation subsystem 714, a network module 716, an advanced driver assistance system (ADAS) 718, and the audio application 140. The audio application 140 is configured to receive and process vibration data acquired by seat-embedded vibration sensors(s), which can also be combined with sound data acquired by acoustic microphone(s), as described above in conjunction with FIGS. 2-5. For example, the audio application 140 could be a hands-free communication application, a voice recording application, or a virtual assistant application. The output module 740 includes a display 742 and a speaker 744. In some embodiments, the speaker 744 can be controlled by the audio application 140 to play back sounds corresponding to vibration data acquired by seat-embedded vibration sensor(s) within the vehicle and/or other vehicles.

The network module 716 receives and transmits data via the network 150. In some embodiments, the network module 716 retrieves sensor data, including vibration data acquired by seat-embedded vibration sensor(s), from the sensor module 720. In some embodiments, the network module 716 can transmit data acquired by the head unit 230, such as sensing data 762 that includes vibration data associated with speech by a driver or passenger. For example, the audio application 140 could be a Bluetooth application that permits hands-free communication. In such a case, the vibration data can be transmitted to another device or vehicle via the network 150 by the network module 716.

Figure 8:
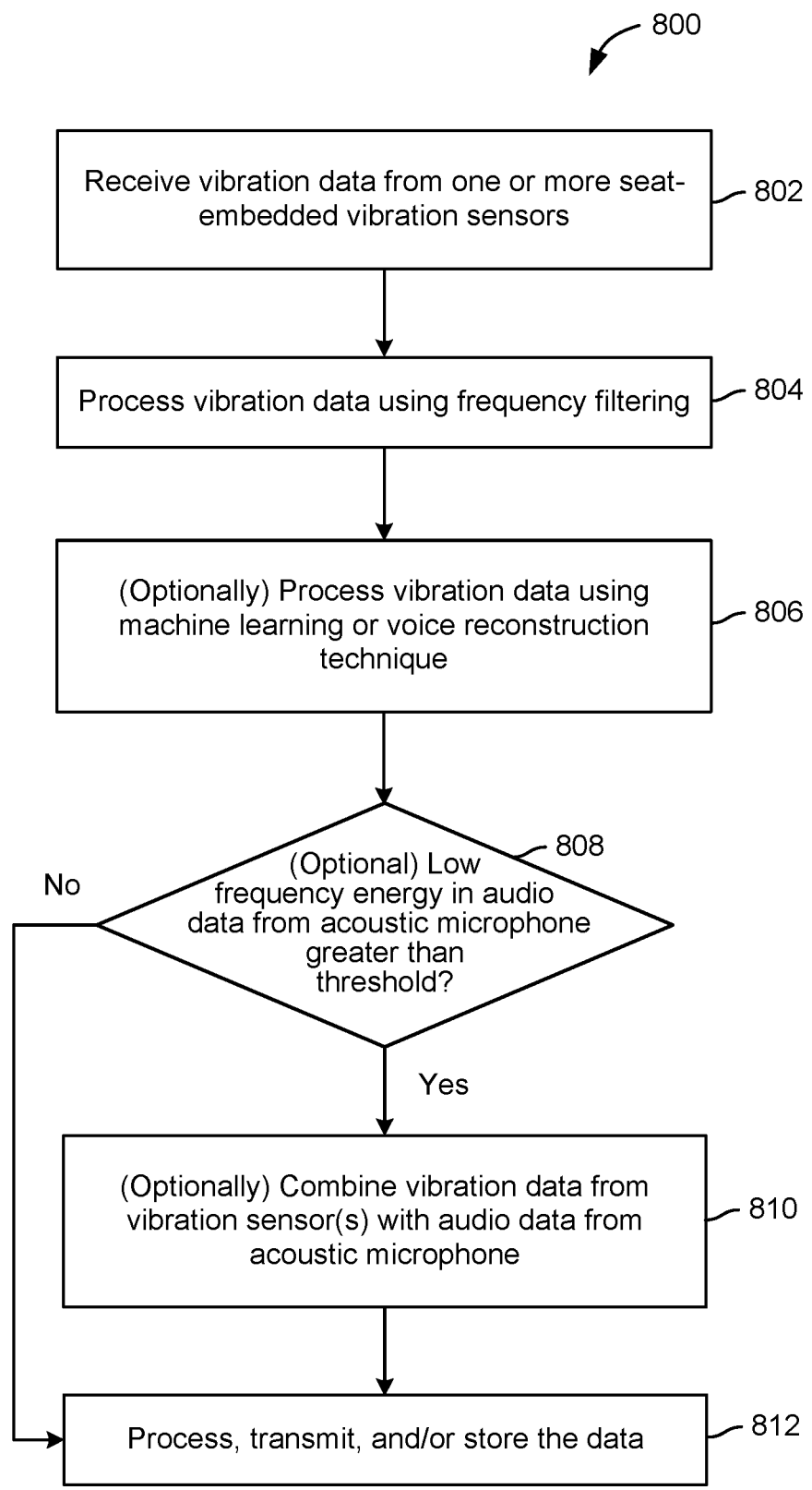
FIG. 8 is a flow diagram of method steps for processing vibration sensor signals, according to various embodiments.

FIG. 8 is a flow diagram of method steps for processing vibration sensor signals, according to various embodiments. Although the method steps are described with respect to the systems of FIGS. 1-5 and 7, persons skilled in the art will understand that any system configured to perform the method steps, in any order, falls within the scope of the various embodiments.

As shown, a method 800 begins at step 802, where the audio application 140 receives vibration data from one or more seat-embedded vibration sensors. In some embodiments, the one or more seat-embedded vibration sensors can be a single vibration sensor or multiple vibration sensors that are embedded within the seatback of a seat. The vibration data can be associated with any technically-feasible physical quantity, such as vibrational displacement/deformation, dynamic strain/stress, velocity, and/or acceleration. Examples of seat-embedded vibration sensors are described above in conjunction with FIGS. 2-5. Although discussed herein primarily with respect to vehicle seats, vibration sensors can be embedded within seats that are not included in a vehicle. In some embodiments, the audio application 140 can also receive signals from one or more pressure sensors or contact switches that correspond to the one or more seat-embedded vibration sensors. In such cases, the audio application 140 only uses vibration data from seat-embedded vibration sensor(s) if the signals from corresponding pressure sensor(s) or contact switch(es) indicate that a clothed or unclothed portion of the body of an occupant of the seat is in contact with those vibration sensor(s).

At step 804, the audio application 140 processes the vibration data using frequency filtering. In some embodiments, the frequency filtering includes applying a high-pass filter to remove energies in the vibration data that are less than 200 Hz-300 Hz in frequency, which may be associated with vehicle vibrations rather than speech. In some embodiments, the frequency filtering filter further includes applying a low pass filter with a cut off frequency between 1 kHz and 4 kHz, because almost no bone conducted speech energy is included in vibration data above the 1 kHz to 4 kHz frequency range. When vibration data is received from multiple seat-embedded vibration sensors, the audio application 140 can also combine the vibration data from the different vibration sensors (e.g., after frequency filtering).

At step 806, the audio application 140 optionally processes the vibration data using a machine learning or a voice reconstruction technique. As described, the machine learning or voice reconstruction technique can be applied to reconstruct more naturally-sounding speech from vibration data acquired by the vibration sensors(s), because speech-correlated frequency contents in vibration data does not generally include high-frequency contents of sound data that is acquired by an acoustic microphone. For example, in some embodiments, the machine learning or voice reconstruction technique can reconstruct components of speech at the higher frequencies that are not included in the vibration data.

At step 808, the audio application 140 optionally determines whether the low-frequency energy in sound data received from an acoustic microphone is greater than a threshold amount. As described, when the sound data includes more than the threshold amount of low-frequency energy, then the sound data may be polluted by an unacceptable amount of wind noise. In such cases, only vibration data that is acquired by the vibration sensor(s) is used in some embodiments.

When the low-frequency energy in the sensor data from the acoustic microphone is not greater than the threshold amount, then at step 810, the audio application 140 optionally combines the (processed) vibration data from the seat-embedded vibration sensor(s) with the sound data from the acoustic microphone. When the audio application 140 determines at step 808 that the low frequency energy in the sensor data from the acoustic microphone is greater than the threshold energy, or after the audio application 140 combines the (processed) vibration data from the seat-embedded vibration sensor(s) with the sound data from the acoustic microphone at step 810, then at step 812, the audio application 140 processes, transmits, and/or stores the data generated at steps 804, 806, or 810, depending on whether optional steps 806 or 810 are performed. The data can be processed, transmitted, and/or stored in any technically-feasible manner, including using well-known techniques. For example, the data could be processed using a speech recognition technique, and action(s) could be performed based on the recognized speech. As another example, the data could be transmitted to another device or vehicle for playback as sounds via one or more speakers. As a further example, the data could be stored in a file in a data store.

In sum, seat-embedded vibration sensors are disclosed. In some embodiments, one or more vibration sensors are secured within corresponding cavities in the foam cushion layer of a seat, such as a seat within a vehicle. In operation, the vibration sensor(s) acquire vibration data associated with speech of an occupant of the seat while the occupant is speaking. The acquired vibration data can be processed by combining the vibration data from multiple vibration sensors, applying frequency, applying a machine learning or voice reconstruction technique to reconstruct a more natural-sounding voice, and/or combining the vibration data with sound data acquired by an acoustic microphone, among other things. In particular, the vibration data can be combined with sound data acquired by an acoustic microphone when the sound data includes less than a threshold amount of low-frequency energy, indicating that there is relatively little wind noise.

At least one technical advantage of the disclosed techniques relative to the prior art is that the disclosed techniques can be used to capture speech within a vehicle cabin with a better signal-to-noise ratio relative to speech that is captured using an acoustic microphone. As a result, the captured speech can be more intelligible than speech that is captured using an acoustic microphone, particularly when there is wind noise caused by the vehicle being driven at a high speed, with windows open, with an open sun or moon roof, or with the top down in a convertible. These technical advantages represent one or more technological improvements over prior art approaches.

1. In some embodiments, a computer-implemented method comprises receiving first sensor data from one or more vibration sensors that are embedded within a seat, wherein the first sensor data includes data associated with speech by an occupant of the seat, and at least one of processing, transmitting, or storing the first sensor data based on the data associated with the speech.

2. The computer-implemented method of clause 1, wherein the first sensor data is processed by filtering out sensor data associated with frequencies that are below a predefined frequency.

3. The computer-implemented method of clauses 1 or 2, wherein the first sensor data is further processed by filtering out sensor data associated with frequencies that are above a predefined frequency.

4. The computer-implemented method of any of clauses 1-3, further comprising combining the first sensor data with second sensor data from one or more acoustic microphones.

5. The computer-implemented method of any of clauses 1-4, further comprising determining whether to combine the first sensor data with the second sensor data based on frequencies indicated by at least one of the first sensor data or the second sensor data.

6. The computer-implemented method of any of clauses 1-5, wherein the first sensor data is combined with the second sensor data based on a level of signal output by the one or more vibration sensors and the one or more acoustic microphones.

7. The computer-implemented method of any of clauses 1-6, further comprising determining whether an amount of low-frequency energy indicated by the second sensor data is less than a threshold.

8. The computer-implemented method of any of clauses 1-7, further comprising receiving a signal from a pressure sensor or a contact switch, wherein the signal indicates that a user is in physical contact with at least one of the one or more vibration sensors.

9. The computer-implemented method of any of clauses 1-8, further comprising processing the first sensor data using at least one of a machine learning technique or a voice reconstruction technique.

10. In some embodiments, a seat comprises a cushion, wherein a side of the cushion facing a user comprises a cavity, and a vibration sensor that is disposed within the cavity, wherein the vibration sensor acquires vibration data that includes data associated with speech by an occupant of the seat, and the vibration data is at least one of processed, transmitted, or stored based on the data associated with the speech.

11. The seat of clause 10, further comprising a cover that covers the cushion and the vibration sensor.

12. The seat of clauses 10 or 11, wherein the vibration sensor senses at least one of acceleration, velocity, displacement, stress, or strain.

13. The seat of any of clauses 10-12, wherein the cushion comprises a seatback cushion, and a side of the vibration sensor protrudes from the seatback cushion.

14. The seat of any of clauses 10-13, wherein the side of the cushion comprises at least one other cavity, and the seat further comprises at least one other vibration sensor disposed within the at least one other cavity.

15. The seat of any of clauses 10-14, wherein the vibration sensor and a printed circuit board assembly are disposed within a housing, and the housing is disposed within the cavity.

16. The seat of any of clauses 10-15, wherein at least one of a pressure sensor or a contact switch is also disposed within the housing.

17. The seat of any of clauses 10-16, wherein the vibration sensor is configured to sense vibration frequencies up to at least 3 kHz.

18. The seat of any of clauses 10-17, wherein the seat is disposed within a vehicle.

19. In some embodiments, one or more computer-readable storage media include instructions that, when executed by one or more processors, cause the one or more processors to perform steps of receiving first sensor data from one or more vibration sensors that are embedded within a seat, wherein the first sensor data includes data associated with speech by an occupant of the seat, and at least one of processing, transmitting, or storing the first sensor data based on the data associated with the speech.

20. The one or more computer-readable storage media of clause 19, wherein the instructions, when executed by the one or more processors, further cause the one or more processors to combine the first sensor data with second sensor data from one or more acoustic microphones.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving vibration data from one or more vibration sensors that are embedded within a seat, wherein:
     the seat includes a cushion with a side of the cushion comprising a cavity, the side being configured to face a user,
     the one or more vibration sensors are disposed within the cavity, and
     the first sensor data includes data associated with speech by an occupant of the seat; and
   based on the data associated with the speech, at least one of:
     processing, by a speech recognition algorithm, the vibration data to translate the vibration data into text, or
     transmitting the vibration data to another device for playback as sound.

2. The computer-implemented method of claim 1, wherein the first sensor data is processed by filtering out sensor data associated with frequencies that are below a predefined frequency.

3. The computer-implemented method of claim 1, wherein the first sensor data is processed by filtering out sensor data associated with frequencies that are above a predefined frequency.

4. The computer-implemented method of claim 1, further comprising combining the first sensor data with second sensor data from one or more acoustic microphones.

5. The computer-implemented method of claim 4, further comprising determining whether to combine the first sensor data with the second sensor data based on frequencies indicated by at least one of the first sensor data or the second sensor data.

6. The computer-implemented method of claim 4, wherein the first sensor data is combined with the second sensor data based on a level of signal output by the one or more vibration sensors and the one or more acoustic microphones.

7. The computer-implemented method of claim 4, further comprising determining whether an amount of low-frequency energy indicated by the second sensor data is less than a threshold.

8. The computer-implemented method of claim 1, further comprising receiving a signal from a pressure sensor or a contact switch, wherein the signal indicates that a user is in physical contact with at least one of the one or more vibration sensors.

9. The computer-implemented method of claim 1, further comprising processing the first sensor data using at least one of a machine learning technique or a voice reconstruction technique.

10. A seat, comprising:
    a cushion, wherein a side of the cushion comprises a cavity, the side being configured to face a user; and
    a vibration sensor that is disposed within the cavity, wherein:
      the vibration sensor acquires vibration data that includes data associated with speech by an occupant of the seat, and
      the vibration data is at least one of:
        (i) processed by a speech recognition algorithm to translate the vibration data into text, or
        (ii) transmitted to another device for playback as sound.

11. The seat of claim 10, further comprising a cover that covers the cushion and the vibration sensor.

12. The seat of claim 10, wherein the vibration sensor senses at least one of acceleration, velocity, displacement, stress, or strain.

13. The seat of claim 10, wherein the cushion comprises a seatback cushion, and a side of the vibration sensor protrudes from the seatback cushion.

14. The seat of claim 10, wherein the side of the cushion comprises at least one other cavity, and the seat further comprises at least one other vibration sensor disposed within the at least one other cavity.

15. The seat of claim 10, wherein the vibration sensor and a printed circuit board assembly are disposed within a housing, and the housing is disposed within the cavity.

16. The seat of claim 15, wherein at least one of a pressure sensor or a contact switch is also disposed within the housing.

17. The seat of claim 10, wherein the vibration sensor is configured to sense vibration frequencies up to at least 3 kHz.

18. The seat of claim 10, wherein the seat is disposed within a vehicle.

19. The seat of claim 10, wherein:
sensor data is acquired by one or more acoustic microphones;
when an amount of low frequency energy in the sensor data is less than a threshold, the vibration data is combined with the sensor data to produce combined data; and
the combined data is at least one of:
(i) processed by a speech recognition algorithm to translate the vibration data into text, or
(ii) transmitted to the another device for playback as sound.

20. One or more computer-readable storage media including instructions that, when executed by one or more processors, cause the one or more processors to perform steps of:
receiving vibration data from one or more vibration sensors that are embedded within a seat, wherein:
the seat includes a cushion with a side of the cushion comprising a cavity, the side being configured to face a user,
the one or more vibration sensors are disposed within the cavity, and
the vibration data includes data associated with speech by an occupant of the seat; and
based on the data associated with the speech, at least one of:
processing, by a speech recognition algorithm, the vibration data to translate the vibration data into text, or
transmitting the vibration data to another device for playback as sound.

* * * * *